Oct. 12, 1965        J. T. VOSBIKIAN         3,210,794
                      CLEANING DEVICE
Filed May 12, 1964                        2 Sheets-Sheet 2
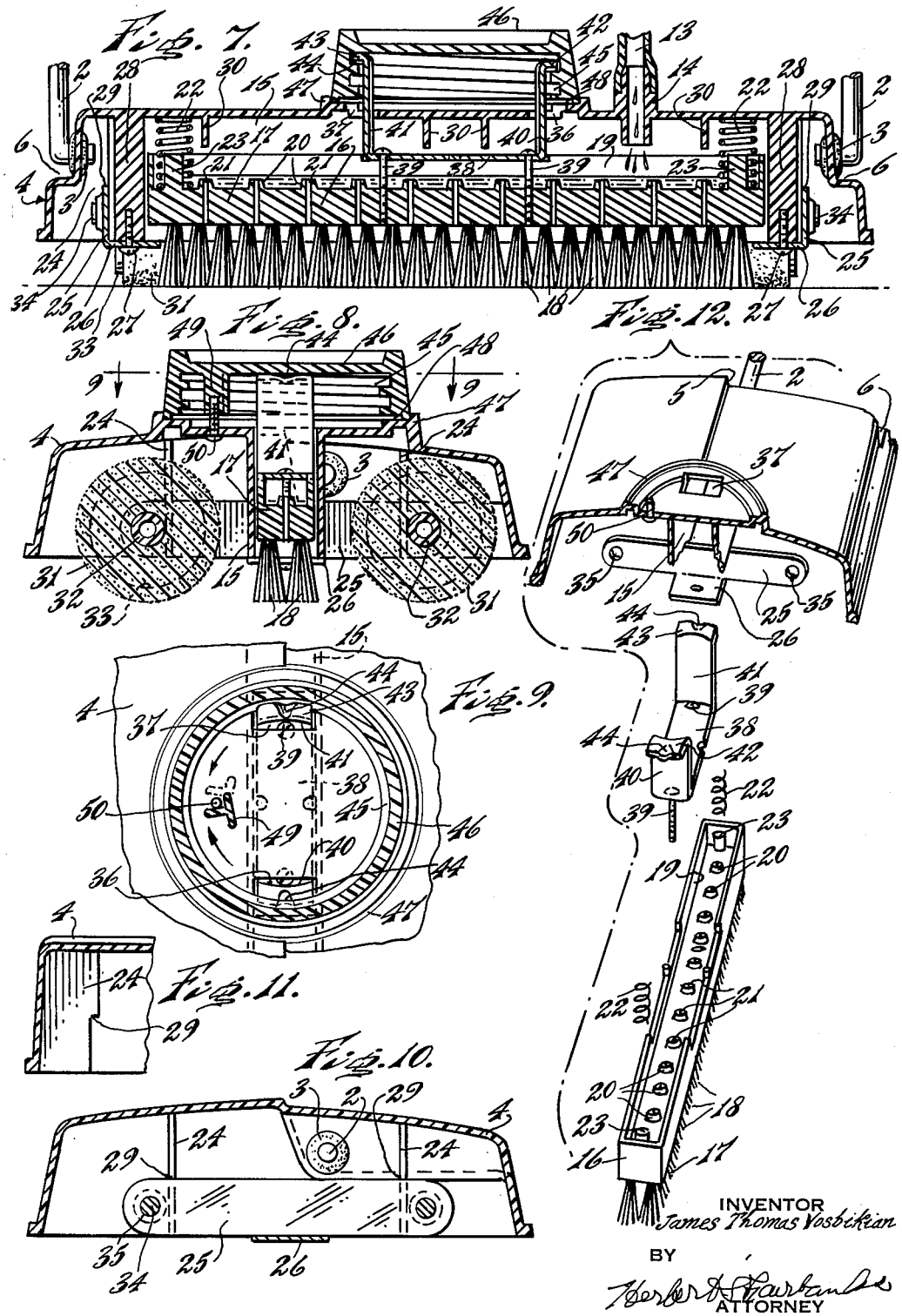

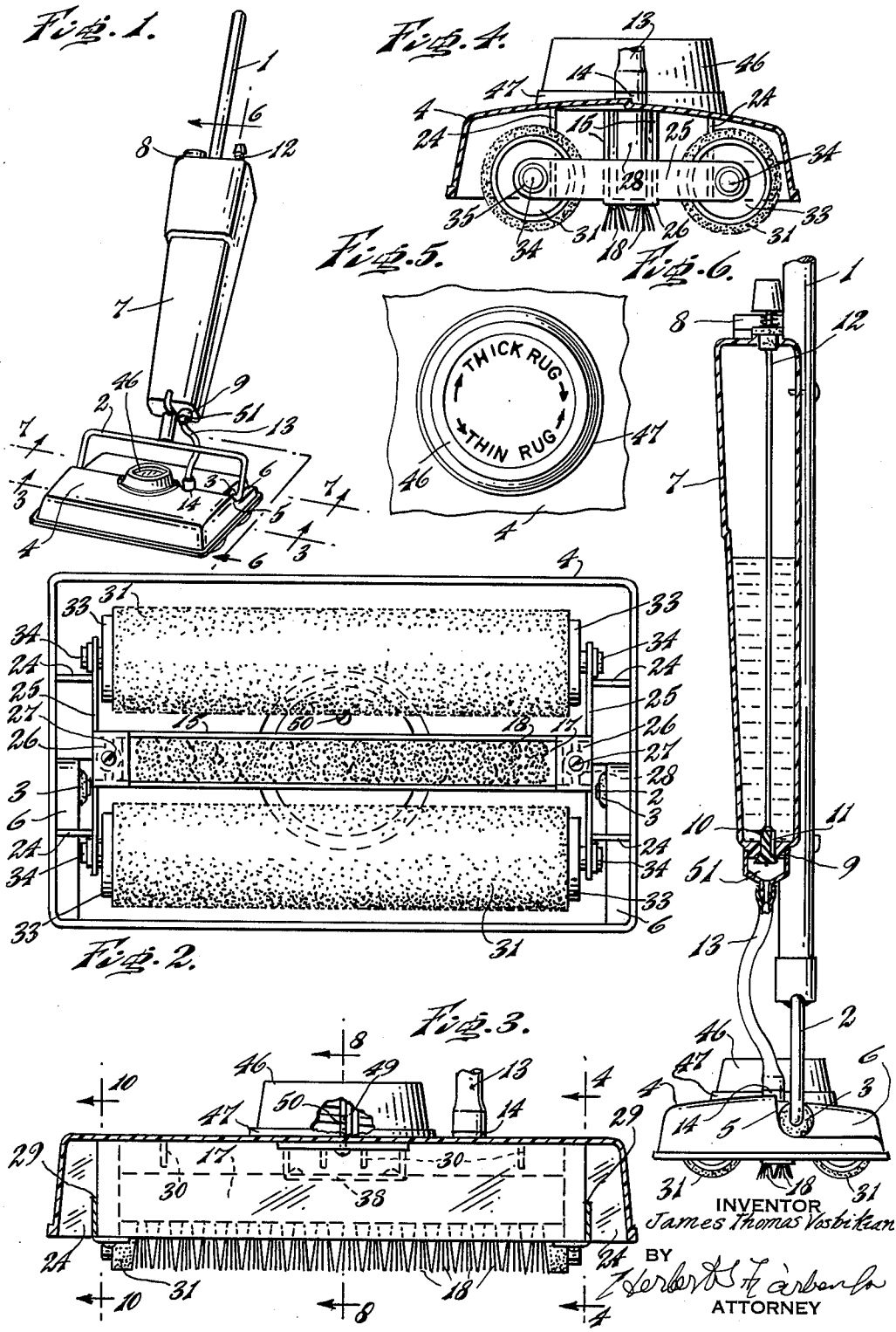

United States Patent Office 3,210,794
Patented Oct. 12, 1965

3,210,794
CLEANING DEVICE
James Thomas Vosbikian, 20th and Oxford Sts.,
Philadelphia, Pa.
Filed May 12, 1964, Ser. No. 366,716
7 Claims. (Cl. 15—533)

The purpose of this invention is to devise a novel cleaning device which, while more particularly designed for the shampooing of carpets and rugs in place on a floor, is also adapted for the scrubbing and scouring of a bare floor, or its covering, such as for example, tile or linoleum.

Further purposes of the invention are to devise a novel construction and arrangement of a cleaning head linked to a handle, provided with a tank and valve controlled mechanism for feeding the cleaning liquid, with a novel construction and arrangement of a brush, the heighth of which is controlled by a novel dial arrangement carried by the cleaning head, and novel mechanism for mounting rolls, positioned at opposite sides of the brush.

With the foregoing purposes in view, and other novel features which will hereinafter be clearly set forth, the invention comprehends a novel cleaning device.

For the purpose of illustrating the invention, I have shown in the accompanying drawings a preferred embodiment of it, which in practice will give reliable and satisfactory results. It is, however, to be understood, that I am not limited to the precise arrangement of the instrumentalities described herein, except by the scope of the appended claims.

FIGURE 1 is a perspective view of a cleaning device embodying my invention.

FIGURE 2 is a bottom plan view of the cleaning head on an enlarged scale.

FIGURE 3 is a longitudinal section on an enlarged scale, taken on line 3—3 of FIGURE 1.

FIGURE 4 is a transverse section on line 4—4 of FIGURE 3.

FIGURE 5 is a fragmentary top plan view of the cleaning head to more clearly show the dial.

FIGURE 6 is a vertical irregular section on an enlaged scale, taken on line 6—6 of FIGURE 1.

FIGURE 7 is a longitudinal section on an enlarged scale, taken on line 7—7 of FIGURE 1.

FIGURE 8 is a fragmentary section on line 8—8 of FIGURE 3.

FIGURE 9 is a section on line 9—9 of FIGURE 8.

FIGURE 10 is a fragmentary section on line 10—10 of FIGURE 3.

FIGURE 11 is a section on line 11—11 of FIGURE 10.

FIGURE 12 is an exploded view of some of the component parts, with the cleaning head partly in section.

Similar numerals of reference indicating corresponding parts are shown herein.

Referring to the drawings:

The cleaning device has a handle 1, connected at its lower end with a bail 2, the free ends of which are inwardly deflected and mounted in rubber grommets 3, extending into end walls of a head 4. When the handle and bail which is fixed thereto in any desired manner, are raised to a substantially upright position, the sides of the bail engage stop portions 5 in the end walls of the head 4, to retain the bail and handle in an upright position, the end walls also being recessed as at 6 to permit movement of the sides of the bail.

The tank and valve controlled mechanism

A tank 7, is detachably connected with the handle 1, in any desired manner and is provided with a controllable filling opening 8, mounted at its upper end, and a discharge opening 9 at its lower end, controlled by a conically shaped valve 10, provided with a channel 11 in its side wall to permit free flow of liquid from the tank when the valve is opened. The valve is manually controlled by a tensioned rod 12 extending through the top of the tank. Such construction being similar, except for the channel 11, to that broadly claimed in my prior patent for Waxers and Polishers, No. 3,126,573. The valve discharge opening 9 is provided with a flexible hose 13, said hose being connected in turn to tube 14, extending through the top wall of the head 4. The head 4 is in the form of a rectangularly shaped pan, having a closed top wall, a front and a rear wall, enclosed end walls and open at its bottom, thus forming a chamber to receive brushing and scouring mechanism.

Brushing and scrubbing mechanism

The bottom of the top wall of the head supports a longitudinally extending channel 15, open at its bottom and with its ends closed. This channel is adapted to receive and guide, the back 16 of a brush 17, having bristles or scrubbing means 18, of any desired or conventional type. The brush back 16 is provided with a longitudinal channel 19 at its upper end, and the bottom of the channel is provided with upwardly extending projections 20, spaced along the length of the bottom of the channel 19, and apertured at 21 to pass liquid in the channel through the back to the bristles, throughout the length of the channel and bristles. The projections 20 cause a certain amount of liquid to be retained in the channel and result in a more even distribution of liquid through all of the apertures 21. Coil springs 22 are positioned on bosses 23, positioned near the ends of the channel, with the springs bearing against the bottom of the top wall of the head and tending to move the brush downwardly. The ends of the channel 19 terminate inwardly of the end walls of the head 4 to space them from aligning members 24, between which and the ends of the channel, end brackets 25 are aligned in position. The end brackets 25, at their bottoms have inwardly deflected flanges 26 which are apertured to receive fastening devices 27, such as screws, which engage bosses 28 fixed to the bottom of the top wall of the head 4. The flanges 26 of the end brackets 25 overhang the bottom portion of the back at its ends, to limit the downward movement of the brush in channel 19. The aligning members 24 are provided with steps 29 to engage and align the end brackets 25. The channel 19 is also provided with cross ribs 30 which limit the extent of upward movement of the brush in its channel.

The end brackets 25 are identical, as well as the rolls 31. The rolls consist of a central core 32, connected with end caps 33, on which the rolls 31 are mounted, and the end caps 33 are provided with trunnions 34, which are received in apertures 35 in the end brackets 25, so that each roll is spaced in the same manner from the brush.

The top wall of the head 4 has spaced openings 36 and 37, which open into the channel 19 and are adapted to respectively receive a U shaped connector 38 which is secured to the top of the brush back for fastening devices 39. The connector 38 has two upwardly extending plates 40 and 41, which extend through the slots or openings 36 and 37 in the head, and the first plate 40 has its upper end laterally and outwardly deflected to form a thread follower 42. The opposite plate 41 is longer than the plate 40 in order to engage the pitch of the thread of the dial and also has its upper end laterally and outwardly deflected to form a thread follower 43. These thread followers 42 and 43 have their central portion deflected a suitable distance as at 44, to conform to the thread 45 of a dial 46. The dial is in the form of a cap which is positioned by an upstanding annular rib 47 on the top wall of the head 4. The bottom wall of the cap is provided with an annular recess 48 to reduce frictional contact of the dial with the head. The bottom wall of the top of the dial is provided with a downwardly extending lug 49 to limit rotation of the dial in either direction by contacting a stop member 50, such as for example a screw, which extends through the top wall of the head in a position to contact the dial lug 49 to limit rotation of the dial in a raising or lowering of the brush. The top of the dial preferably is provided with arrows to indicate the direction of dial rotation to indicate the raising or lowering of the brush.

The operation will now be apparent to those skilled in the art.

Assuming that the tank has been filled with a desired cleaning liquid, and the device is being moved either forwardly or backwardly over a floor or floor covering, such as a rug, carpet, tile or linoleum, the operator opens the valve to permit cleaning fluid to pass from the tank into the channel containing the brush, and through the brush back into the bristles. The heighth of the brush above the floor or floor covering may be regulated as already explained, by turning the dial in the proper direction.

It will be noted that the stop member 50, when in position in the head 4, prevents the removal of the dial from the thread followers, which in turn are fixed to the back of the brush by their U shaped bracket.

It will also be noted that a coarse thread of about three turns is employed in the dial, and the difference in heighth of the upwardly extending plates 40 and 41 of the U shaped connector 38 are arranged so as to properly engage the thread on the dial.

If it is desired to replace the brush, the stop screw 50 must first be removed. The dial may then be unscrewed from the thread followers. The brackets supporting the rolls are then removed, together with the rolls, and the brush may then be removed.

The upwardly extending projections 20, in the channel 19 of the brush back, cause the liquid from the tank to maintain a minimum constant level in the channel to provide an even distribution of liquid to the apertures 21.

It will be apparent that in case it is not desired to employ a dial connected with the brush, to vertically adjust its position in the head, the connector plate, the openings in the head and the dial may be dispensed with and the coil springs which tend to move the brush downwardly, can be of any desired strength to provide the desired tension, or maintain the brush in a rigid condition in the head.

The discharge from the valve to the hose is through a funnel 51.

It will be apparent, as best seen in FIGURE 9, that only one turn of the dial is necessary to adjust the position of the brush in its extreme upward or downward position.

Having thus described my invention, what I claim as new and desire to secure by Letters Patent is:

1. A cleaning device comprising a handle, a head to which the handle is pivotally connected, said head having closed sides and ends and open at its bottom, a channel extending longitudinally in the head with closed sides and ends, a brush comprising a back and bristles, with the back mounted in said channel, end brackets fixed within said head, and having means to limit downward movement of the brush, springs tending to move the brush downwardly, resilient rollers carried by said end brackets at opposite sides of the brush, a tank having a valve controlled discharge port, communicating through the top wall of said head into said channel, the back of said brush having a channel opening through its top and having apertures terminating above the bottom of the channel in the back and discharging to the bristles of the brush.

2. The construction defined in claim 1, wherein the means for limiting downward movement of the brush in its channel are in the form of flanges of the end brackets extending beneath the bottom of the ends of the back of the brush.

3. The means defined in claim 1, wherein the brush back has fixed to it upwardly extending connectors and the top wall of the head is provided with openings through which said connectors extend and a dial rotatable on said head and having an internal thread engaged by the upper end of the connectors to effect the vertical adjustment of the brush within its channel.

4. The means defined in claim 1, wherein the brush back has fixed to it upwardly extending connectors and the top wall of the head is provided with openings through which said connectors extend and a dial rotatable on said head having an internal thread, the upper end of the connectors being laterally and outwardly deflected to engage the thread of the dial.

5. The means defined in claim 1, wherein the brush back has fixed to it upwardly extending connectors and the top wall of the head is provided with openings through which said connectors extend and a dial rotatable on said head having an internal thread, the upper end of the connectors being laterally and outwardly deflected to engage the thread of the dial, said dial having a lug and a screw extending through the top of the head into the path of said lug, serving as a stop to limit the rotation of the dial in either direction.

6. The means defined in claim 1, wherein aligning means between the end wall of the head and the ends of the channel in the head, position the end brackets in the head.

7. The means defined in claim 1, wherein the pivotal connection of the head with the handle is in the form of a bail and the ends of the head are recessed to permit upward movement of the sides of the bail and provide a stop to retain the bail and handle in substantially upright position.

References Cited by the Examiner

UNITED STATES PATENTS 3,170,186  2/65  Kramer _____ 15—532

CHARLES A. WILLMUTH, *Primary Examiner.*